United States Patent
Yano et al.

(10) Patent No.: US 6,890,648 B2
(45) Date of Patent: May 10, 2005

(54) CR-FREE PAINT COMPOSITIONS AND PAINTED METAL SHEETS

(75) Inventors: Hirokazu Yano, Ichi-kawa (JP); Yoshikatsu Udagawa, Ichi-kawa (JP); Minoru Kiyotsuka, Ichi-kawa (JP); Kiyoshi Takatsu, Ichi-kawa (JP)

(73) Assignee: Nisshin Steel Co., Ltd., Tokyo (JP)

( * ) Notice: Subject to any disclaimer, the term of this patent is extended or adjusted under 35 U.S.C. 154(b) by 0 days.

(21) Appl. No.: 09/870,037

(22) Filed: May 30, 2001

(65) Prior Publication Data

US 2002/0031679 A1 Mar. 14, 2002

(30) Foreign Application Priority Data

Feb. 3, 2000 (JP) ........................................ 2000-026355
Jul. 12, 2000 (JP) ........................................ 2000-210718

(51) Int. Cl.[7] ............................ B32B 5/16; B32B 27/36; B32B 27/00; B32B 15/08
(52) U.S. Cl. ...................... 428/331; 428/219; 428/330; 428/413; 428/457; 428/458; 428/421; 428/480
(58) Field of Search .................... 428/219, 330, 428/331, 413, 428, 457, 458, 421, 480, 323, 328, 441.1, 418, 414, 416; 106/14.05, 14.12, 14.13, 14.14, 14.34, 14.35, 14.41, 14.44

(56) References Cited

U.S. PATENT DOCUMENTS

| | | | | |
|---|---|---|---|---|
| 5,623,003 A | * | 4/1997 | Tanaka | 523/428 |
| 5,736,255 A | * | 4/1998 | Sasaki et al. | 428/469 |
| 6,015,628 A | * | 1/2000 | Urata et al. | 428/623 |
| 6,180,177 B1 | * | 1/2001 | Nagashima et al. | 427/388.4 |
| 6,562,474 B1 | * | 5/2003 | Yoshimi et al. | 428/472.3 |

* cited by examiner

*Primary Examiner*—Sheeba Ahmed
(74) *Attorney, Agent, or Firm*—Webb Ziesenheim Logsdon Orkin & Hanson, P.C.

(57) ABSTRACT

A paint composition containing a corrosion inhibitor A prepared from porous silica particles, to which Ca ion is bonded by ion-exchange, and a polyphosphate B preferably at an A/B weight ratio of 60/40 to 5/95 and at an A+B ratio of 5–150 parts by weight based on 100 parts by weight of resinous components. A base metal sheet is preferably one pre-treated with a chemical agent containing at least one fluoroacid. Since the polyphosphate B controls dissolution of Ca ion, an effect of Ca ion on corrosion inhibition is maintained over a long term. The painted metal sheet does not put harmful influences on the environment, since it does not contain chromium compounds.

11 Claims, No Drawings

CR-FREE PAINT COMPOSITIONS AND PAINTED METAL SHEETS

FIELD OF THE INVENTION

The present invention relates to paint compositions containing a Cr-free corrosion inhibitor and also a painted metal sheet excellent in corrosion resistance.

BACKGROUND OF THE INVENTION

A pre-coated steel sheet has been broadly used in various fields such as a surfacing member for electric home appliance or an air conditioner and other goods, due to its good productivity compared with a steel sheet, which is formed to an objective shape prior to application of paint.

The pre-coated steel sheet is manufactured by applying synthetic resin paint to both surfaces or one surface (which will be an external surface of a product) of a steel sheet, and baking the applied paint to form a paint layer. A corrosion inhibitor is commonly added to the resin paint in order to improve corrosion resistance of the paint layer. Adhesiveness of the paint layer is enhanced by chemically converting the surface of a steel sheet to a chromated or phosphated state prior to paint application. The chemically converted surface layer also affects improvement of corrosion resistance.

In a process of manufacturing a painted steel sheet having a single coat, one kind of paint containing a color pigment and a corrosion inhibitor is applied to the surface and then baked. In a process of manufacturing a painted steel sheet having two or more coats, a primer containing an extender and a corrosion inhibitor is applied to a surface of the steel sheet, and then intercoat and topcoat paints, which do not contain a corrosion inhibitor, are applied to the undercoat. A back surface of the steel sheet may be also coated with paint containing a corrosion inhibitor.

Chromium compounds or pigments based on chromium compounds, e.g. zinc chromate, strontium chromate, red chromate and red silicochromate, have been used so far as a corrosion inhibitor, due to excellent corrosion-inhibiting faculty. However, there is a stronger demand in these days for provision of a steel sheet coated with a paint layer free from chromium compounds, which exert harmful influences on the environment. In order to cope with such the demand, a corrosion inhibitor prepared from porous silica particles, to which Ca, Zn, Co, Pb, Sr or Ba ion is bonded by ion-exchange, is proposed instead of chromium compounds.

The proposed corrosion inhibitor captures corrosive ions such as hydrogen ion and discharges the bonded ion in return. Especially, Ca ion-bonded corrosion inhibitor performs good corrosion-inhibiting faculty. Such corrosion inhibitor is ordinarily added to paint at a ratio of 2–50 parts by weight based on 100 parts by weight of resinous components in a paint layer. However, the Ca ion-bonded corrosion inhibitor is somewhat insufficient of corrosion and moisture resistance in comparison with chromium compounds, so that blisters often occur in a paint layer in a wet atmoshpere.

SUMMARY OF THE INVENTION

The present invention aims at provision of a metal sheet coated with a resin paint containing a corrosion inhibitor prepared from Ca ion-bonded silica particles whose corrosion inhibiting faculty is enhanced by coexistence of a polyphosphate.

The present invention proposes new paint composition containing a corrosion inhibitor prepared from porous silica particles, to which Ca ion is bonded by ion-exchange, together with a polyphosphate at a ratio predetermined in relation with a ratio of the corrosion inhibitor.

The polyphosphate is preferably aluminum pyrophosphate, aluminum metaphosphate or aluminum dihydrogentripolyphosphate. Especially, aluminum dihydrogentripolyphosphate performs best results. The polyphosphate may be used in a state mixed or coated with zinc oxide, titanium oxide, magnesium compound, a silane coupling agent or silicone oil, to improve corrosion resistance and storage stability.

Ca-bonded silica particles (hereinafter referred to as "the corrosion inhibitor A") are generally added to resin paint at a ratio of 2–50 parts by weight based on 100 parts by weight of resinous components of the paint. The polyphosphate (hereinafter referred to as "the polyphosphate B") is added to the resin paint at an A/B weight ratio of 60/40 to 5/95 and at an A+B ratio of 5–150 parts by weight based on 100 parts by weight of resinous components of the paint.

The proposed paint is used for formation of an undercoat or a single coat on a base metal sheet such as a steel sheet plated with a Zn, alloyed Zn, Zn-5% Al or Zn-55% Al layer. A surface of the base metal sheet is preferably chemically processed to a state affinitive to the paint.

DETAILED DESCRIPTION OF THE PREFERRED EMBODIMENTS

The inventors have researched the reason why the corrosion inhibitor A does not exhibit good corrosion inhibiting faculty as compared with a conventional corrosion inhibitor based on chromium compounds especially in a wet atmosphere, and discovered that an effect of Ca ion bonded to silica particles is not maintained over a long term since Ca ion is easy to dissolve in water permeated into a paint layer.

The corrosion inhibitor A could be improved in moisture resistance by coating silica particles with hydrophobic films such as a silane coupling agent or silicone oil in order to suppress dissolution of Ca ion. However, such hydrophobic coating closes pores of the silica particles and scarcely permits dissolution of Ca ion, resulting in degradation of corrosion resistance. The inventors have researched and examined various means to suppress dissolution of Ca ion, and hit upon addition of a polyphosphate to paint.

The polyphosphate B makes ionic bond similar to chelate bond on surfaces of silica particles. The ionic bond controls dissolution of Ca ion, but does not completely inhibit dissolution of Ca ion. Dissolution of Ca ion may be also suppressed by a pH-buffering effect of the polyphosphate B to moderate acidification caused by corrosive ions such as hydrogen ion.

The polyphosphate B is preferably added to resin paint at an A/B weight ratio of 60/40 to 5/95 and also at an A+B ratio of 5–150 parts by weight based on 100 parts by weight of resinous components of the paint, in order to most efficiently realize the effect of the polyphosphate B.

Addition of the polyphosphate B at the controlled ratio ensures continuous dissolution of Ca ion over a long term without degradation of the corrosion inhibitor A. Excessive addition of the polyphosphate B unfavorably suppresses dissolution of Ca ion, while shortage of the polyphosphate B causes occurrence of blisters in a paint layer due to poor moisture resistance. The A+B ratio in the range of 5–150 parts by weight is also important to form a paint layer with good corrosion resistance, adhesiveness and workability.

Ca ion is bonded to silica particles as the corrosion inhibitor A at a ratio of 3–40% in general. A ratio of the polyphosphate B is adjusted in response to amounts of the corrosion inhibitor A. For instance, a ratio of the polyphosphate is kept higher as increase of Ca ion bonded to the corrosion inhibitor A, but kept lower as decrease of Ca ions bonded to the corrosion inhibitor A.

There are no restrictions on a kind of resin paint to which the corrosion inhibitor A and the polyphosphate B are added, but ordinarily based on polyester, macromolecular polyester, epoxy, epoxy-denatured polyester, epoxy-denatured macromolecular polyester or polyether sulfonate. Molecular weight, glass transition temperature and cross-link density of the resin paint are properly adjusted together with ratios of a curing agent and other pigments, when taking into account the use of a painted steel sheet. For instance, a paint layer with good workability is obtained from resin paint, whose glass transition temperature is adjusted at a level of 40° C. or lower to increase elongation at a higher ratio above 50%.

The resin paint may be applied as a single coat on a metal sheet or as an undercoat which will be further coated with a topcoat. A single coat is preferably of 3–20 μm in thickness, while an undercoat is preferably of 1–15 μm in thickness. Of course, an intercoat may be formed between the undercoat and the topcoat, as occasion demands. If intermediate or topcoat paint contains the corrosion inhibitor A, the polyphosphate B is preferably added to the paint in order to maintain the effect of the corrosion inhibitor A over a long term.

A base metal sheet, to which the resin paint is applied, is preferably a steel sheet coated with a Zn, alloyed Zn, Zn-5% Al alloy or Zn-55% Al alloy layer due to good corrosion resistance. Such a steel sheet is favorably chemically processed prior to paint application, so as to improve adhesiveness of paint layer(s) and corrosion resistance.

Chemical processing is typically chromating. But, other Cr-free processing so as to form a phosphate, silicate, zirconate, manganate or titanate film on a surface of a base metal sheet is adoptable instead of chromating, in order to inhibit dissolution of even a tiny amount of chromium compounds.

Among the Cr-free processings, fluoriding realizes most effective results on corrosion resistance of a painted steel sheet. When a surface of the base metal sheet is chemically converted to a fluorided state at a ratio of 0.5–500 mg/m$^2$ calculated as deposited fluorine and/or at a ratio of 0.1–500 mg/m$^2$ calculated as deposited metals in total, a paint film formed thereon is remarkably improved in corrosion resistance. Such fluorided surface layer is formed by treating the surface of the base metal with a chemical agent containing one or more of fluoroacids. One or more of $H_2TiF_6$, $H_2ZrF_6$, $H_2SiF_6$, $H_2GeF_6$, $H_2SnF_6$ and $HBF_4$ are suitable for the purpose. Especially, $H_2TiF_6$ exhibits best corrosion-inhibiting faculty.

The fluorided surface layer is a corrosion-resistant coat composed of fluorine and metals such as Ti decomposed from fluoroacids, which are deposited on a surface of a metal sheet activated by fluoroacids dissolved in water. Metal components originated in the fluoroacid are reacted with hydroxyl groups of resin primer and also reacted with phosphoric acid discharged from the polyphosphate B in the undercoat. The surface layer of the metal sheet, which has been activated by etching, is reacted with Ca ion supplied from the corrosion inhibitor A in the undercoat, so bonding reaction of resin paint to the surface is accelerated. Consequently, the undercoat is firmly fixed to the surface of the base metal sheet, and a corrosion-resistant layer is generated at the boundary between the base metal sheet and the undercoat. Fluoric ion is also reacted with Ca ion supplied from the corrosion inhibitor A in the undercoat and converted to a stable compound such as calcium fluoride. The stable compound serves as a barrier and further strengthens the fluorided surface layer.

The fluorided coat is preferably formed at a ratio of 0.5–500 mg/m$^2$ calculated as deposited fluorine or at a ratio of 0.1–500 mg/m$^2$ calculated as deposited metals such as Ti, Zr, Hf, Si, Ge, Sn and B in total, in order to gain most advantageous effects on corrosion resistance.

The fluorided coat may further contain one or more of oxides, hydroxides, phosphates, carbonates or other salts of Ti, Zr, Mo, Si, Al, Hf, Ge and Sn. These compounds are dissolved or dispersed in the chemical agent. Other additives, e.g. polyvinyl alcohol, tannic acid, starch, corn starch, water-soluble or dispersible polymer such as acrylic resin, a silane coupling agent, a titanium coupling agent, a surfactant, etc., may be optionally added to the chemical agent.

The chemical agent is applied to a surface of a base metal sheet by a roll-type applicator, spraying or dipping. Thereafter, the surface of the base metal sheet is dried without washing, to form the fluorided coat thereon.

After the fluorided coat is formed on a surface of a base metal sheet, resin paint is applied to the surface by a conventional paint-applying process such as roll-type applying, curtain-flow applying, spraying or dipping. The applied paint is then baked to form an undercoat or a single coat on the surface of the base metal sheet. Primer paint may contain various additives, e.g. inorganic pigments such as titanium oxide, calcium carbonate and silica other than the corrosion inhibitor A and the polyphosphate B.

Various resin paint such as polyester, urethane, vinyl chloride, acrylic, polyether sulfonate, silicone or fluoric resin may be used for formation of a topcoat without any special restrictions. A kind, molecular weight, glass-transition temperature and pigmentary dosage of topcoat resin paint are properly adjusted in response to use of a painted metal sheet as an interior member, cladding, etc. PTFE (polytetrafluoroethylene) may be added to the topcoat paint. An intercoat may be optionally formed on an undercoat in prior to application of topcoat paint, by 3-coat process. Of course, the painted metal having a single coat can be manufactured by 1-coat process. Paint applied to a base metal sheet is ordinarily baked by hot air in a continuous coating line.

EXAMPLE

Example 1

Galvanized steel sheets (of 0.5 mm in thickness, Zn deposition ratio of 45 g/m² per single surface) were chemically pretreated with a Cr-free phosphating agent (I), II a Cr-free silicating agent (II), a Cr-free zirconating agent (III), a Cr-free manganating agent (IV), and a Cr-free titanating agent (V), as shown in Table 1.

Thereafter, epoxy-denatured macromolecular polyester resin paint was applied to each steel sheet and baked 40 seconds at a maximum temperature of 215° C. to form a paint layer of 10 μm in dry thickness.

Paint compositions used in Example 1 contained the corrosion inhibitor A (i.e., porous silica particles to which Ca ion was bonded by ion-exchange) and the polyphosphate B. Ratios of the polyphosphate in relation with the corrosion inhibitor A are shown in Table 1.

TABLE 1

PAINT COMPOSITIONS USED IN EXAMPLE 1

| NOTE | No | pre-treatment | kind | a polyphosphate B a ratio of B (parts by weight) | a weight ratio of A/B | a total ratio (parts by weight) of A + B | color tone |
|---|---|---|---|---|---|---|---|
| IN- | 1 | I | a | 5 | 10/90 | 20 | white |
| VEN- | 2 | I | a | 10 | 10/90 | 40 | white |
| TIVE | 3 | I | a | 15 | 10/90 | 60 | white |
| EXAM- | 4 | I | a | 5 | 10/90 | 50 | white |
| PLES | 5 | I | a | 13 | 25/75 | 50 | white |
|  | 6 | I | a | 25 | 50/50 | 50 | white |
|  | 7 | II | a | 13 | 25/75 | 50 | white |
|  | 8 | III | a | 13 | 25/75 | 50 | white |
|  | 9 | IV | b | 13 | 25/75 | 50 | white |
|  | 10 | V | a | 13 | 25/75 | 50 | white |
|  | 11 | I | b | 13 | 25/75 | 50 | white |
|  | 12 | I | c | 13 | 25/75 | 50 | white |
| COM- | 1 | I | a | 0.5 | 25/75 | 2 | white |
| PARA- | 2 | I | a | 0.5 | 5/95 | 10 | white |
| TIVE | 3 | I | a | 40 | 25/75 | 160 | white |
| EXAM- | 4 | I | a | 0 | 0/100 | 50 | white |
| PLES | 5 | I | a | 1.5 | 3/97 | 50 | white |
|  | 6 | I | a | 40 | 80/20 | 50 | white |
|  | 7 | I | a | 50 | 100/0 | 50 | white |
|  | 8 | I | a | 10 | 5/95 | 200 | white |
|  | 9 | I | zinc phosphate | | | 50 | white |
|  | 10 | I | wet silica | | | 50 | white |
|  | 11 | I | wet silica/a = 25/75 | | | 50 | white |
|  | 12 | I | silica particles/zinc phosphate = 25/75 | | | 50 | white |
|  | 13 | I | strontium chromate | | | 10 | yellow |

Notes for Table 1
1: A polyphosphate a is aluminum dihydrogentripolyphosphate, b is aluminum metapolyphosphate, and c is aluminum pyrophosphate.
2: A total ratio of the corrosion inhibitor A and the polyphosphate B is based on 100 parts by weight of resinous components in a paint layer.
3: Color tone white is derived from titanium oxide added to paint, and yellow is derived from strontium chromate added to paint.

After the applied paint was dried, each painted steel sheet was examined by the following coating performance test. Test results are shown in Table 2 (for inventive examples) and Table 3 (for comparative examples). Test dipping in boiling water Each test piece was immersed 2 hours in boiling water and raised therefrom. The test piece was observed at its external appearance and evaluated as follows:
○: no faults
Δ: occurrence of blisters or dull appearance
X: occurrence of great blisters or dull appearance The test piece was then examined by a taping test, whereby the test piece was bent with 0t, an adhesive tape was stuck onto a bent part, and then the adhesive tape was peeled off the bent part. Thereafter, the paint layer remaining on the surface of the steel sheet was checked and evaluated as follows:
○: no faults
Δ: partial peeling-off of a paint layer
X: significant peeling-off of a paint layer
Tests for Corrosion and Moisture Resistance Each test piece was cross-cut with injuries extending to a steel base, and then subjected to a 240 hours-salt water spray test regulated by JIS Z2371 as a corrosion resistance test. The same cross-cut test piece was held 240 hours in an atmosphere at 50° C. with 98% RH for a moisture resistance test. Thereafter, the test piece was observed at its flat part, and maximum widths of blisters in a paint layer were measured at a lower burred part of a side face and at one side of a cross-cut part. Results were evaluated as follows:
External Appearance at a Flat Part
○: no faults
Δ: occurrence of blisters or dull surface
X: significant blisters or dull surface
Maximum Width of Blisters at a Lower Burred Part of a Side Face
◎: not more than 1 mm
○: 1–3 mm
Δ: 3–6 mm
X: more than 6 mm
Maximum Width of Blisters at One Side of a Cross-cut Part
◎: no blisters
○: not more than 1 mm
Δ: 1–2 mm
X: more than 2 mm

TABLE 2

PROPERTIES OF PAINTED STEEL SHEETS (INVENTIVE EXAMPLES)

| | | | corrosion resistance | | | moisture resistance | | |
|---|---|---|---|---|---|---|---|---|
| | | | | width of blisters | | | width of blisters | |
| | resistance to boiling water | appearance | appearance at a flat part | at a lower burred part of a side face | width of blisters at a cross-cut part | appearance at a flat part | at a lower burred part of a side face | width of blisters at a cross-cut part |
| No | | taping test | | | | | | |
| 1 | ○ | ○ | ○ | ○ | ◎ | ○ | ◎ | ◎ |
| 2 | ○ | ○ | ○ | ◎ | ◎ | ○ | ◎ | ◎ |
| 3 | ○ | ○ | ○ | ◎ | ◎ | ○ | ◎ | ◎ |
| 4 | ○ | ○ | ○ | ◎ | ◎ | ○ | ◎ | ◎ |
| 5 | ○ | ○ | ○ | ◎ | ◎ | ○ | ◎ | ◎ |
| 6 | ○ | ○ | ○ | ◎ | ◎ | ○ | ◎ | ◎ |
| 7 | ○ | ○ | ○ | ◎ | ◎ | ○ | ◎ | ◎ |

TABLE 2-continued

PROPERTIES OF PAINTED STEEL SHEETS (INVENTIVE EXAMPLES)

| | | | corrosion resistance | | | moisture resistance | | |
|---|---|---|---|---|---|---|---|---|
| | resistance to boiling water | | ap- pear- ance | width of blisters at a lower burred | width of blisters | ap- pear- ance | width of blisters at a lower burred | width of blisters |
| No | ap- pear- ance | tap- ing test | at a flat part | part of a side face | at a cross- cut part | at a flat part | part of a side face | at a cross- cut part |
| 8 | ○ | ○ | ○ | ◎ | ◎ | ○ | ◎ | ◎ |
| 9 | ○ | ○ | ○ | ◎ | ◎ | ○ | ◎ | ◎ |
| 10 | ○ | ○ | ○ | ◎ | ◎ | ○ | ◎ | ◎ |
| 11 | ○ | ○ | ○ | ◎ | ◎ | ○ | ◎ | ◎ |
| 12 | ○ | ○ | ○ | ◎ | ○ | ○ | ◎ | ◎ |

TABLE 3

PROPERTIES OF PAINTED STEEL SHEETS (COMPARATIVE EXAMPLES)

| | | | corrosion resistance | | | moisture resistance | | |
|---|---|---|---|---|---|---|---|---|
| | resistance to boiling water | | ap- pear- ance | width of blisters at a lower burred | width of blisters | ap- pear- ance | width of blisters at a lower burred | width of blisters |
| No | ap- pear- ance | tap- ing test | at a flat part | part of a side face | at a cross- cut part | at a flat part | part of a side face | at a cross- cut part |
| 1 | ○ | ○ | ○ | X | X | ○ | ○ | ○ |
| 2 | ○ | ○ | ○ | X | X | ○ | ○ | ○ |
| 3 | Δ | Δ | ○ | ◎ | ◎ | Δ | ◎ | ◎ |
| 4 | ○ | ○ | ○ | X | X | ○ | ◎ | ◎ |
| 5 | ○ | ○ | ○ | Δ | Δ | ○ | ◎ | ◎ |
| 6 | Δ | ○ | ○ | ◎ | ◎ | Δ | ◎ | ◎ |
| 7 | X | Δ | ○ | ◎ | ◎ | Δ | ◎ | ◎ |
| 8 | ○ | Δ | ○ | ○ | ○ | ○ | ◎ | ◎ |
| 9 | ○ | ○ | ○ | X | X | ○ | ◎ | ◎ |
| 10 | ○ | ○ | ○ | X | X | ○ | ◎ | ◎ |
| 11 | ○ | ○ | ○ | Δ | Δ | ○ | ◎ | ◎ |
| 12 | Δ | ○ | ○ | ○ | ○ | ○ | ◎ | ◎ |
| 13 | ○ | ○ | ○ | ○ | ○ | ○ | ◎ | ◎ |

Example 2

After the same steel sheets as in Example 1 were chemically pretreated in the same way, epoxy-denatured macromolecular polyester primer paint was applied to each steel sheet and then baked 30 seconds at a maximum temperature of 215° C. to form an undercoat of 5 μm in dry thickness. Thereafter, macromolecular polyester topcoat paint was applied to the steel sheet and baked 40 seconds at a maximum temperature of 230° C. to form a topcoat film of 15 μm in dry thickness.

Primer paints used in Example 2 had compositions containing the corrosion inhibitor A and the polyphosphate B, as shown in Table 4, while other primer paints for comparison had compositions shown in Table 5.

Properties of paint layers examined by the same tests as in Example 1 are shown in Table 6 (for inventive examples) and FIG. 7 (for comparative examples).

TABLE 4

PRIMER PAINT COMPOSITIONS (INVENTIVE EXAMPLE)

| | | | polyphosphate B | | a total ratio (parts by weight) of A + B |
|---|---|---|---|---|---|
| No | pre- treatment | kind | a ratio of B (parts by wt.) | a weight ratio of A/B | |
| 1 | I | a | 2 | 25/75 | 8 |
| 2 | I | a | 5 | 25/75 | 20 |
| 3 | I | a | 10 | 25/75 | 40 |
| 4 | I | a | 15 | 25/75 | 60 |
| 5 | I | a | 20 | 25/75 | 80 |
| 6 | I | a | 30 | 25/75 | 120 |
| 7 | I | a | 5 | 10/90 | 50 |
| 8 | I | a | 13 | 25/75 | 50 |
| 9 | I | a | 25 | 50/50 | 50 |
| 10 | II | a | 13 | 25/75 | 50 |
| 11 | III | a | 13 | 25/75 | 50 |
| 12 | IV | a | 13 | 25/75 | 50 |
| 13 | V | a | 13 | 25/75 | 50 |
| 14 | I | a | 13 | 25/75 | 50 |
| 15 | I | c | 13 | 25/75 | 50 |

TABLE 5

PRIMER PAINT COMPOSITIONS (COMPARATIVE EXAMPLES)

| | | | polyphosphate B | | a total ratio (parts by weight) of A + B |
|---|---|---|---|---|---|
| No | pre- treatment | kind | a ratio of B (parts by wt.) | a weight ratio of A/B | |
| 16 | I | a | 0.5 | 25/75 | 2 |
| 17 | I | a | 0.5 | 5/95 | 10 |
| 18 | I | a | 60 | 25/75 | 240 |
| 19 | I | a | 0 | 0/100 | 50 |
| 20 | I | a | 1.5 | 3/97 | 50 |
| 21 | I | a | 40 | 80/20 | 50 |
| 22 | I | a | 50 | 100/0 | 50 |
| 23 | I | a | 10 | 5/95 | 200 |
| 24 | I | zinc phosphate | | | 50 |
| 25 | I | wet silica | | | 50 |
| 26 | I | wet silica/a = 25/75 | | | 50 |
| 27 | I | silica particles/zinc phosphate = 25/75 | | | 50 |

TABLE 6

PROPERTIES OF PAINT LAYERS (INVENTIVE EXAMPLES)

| | | | corrosion resistance | | | moisture resistance | | |
|---|---|---|---|---|---|---|---|---|
| | resistance to boiling water | | ap- pear- ance | width of blisters at a lower burred | width of blisters | ap- pear- ance | width of blisters at a lower burred | width of blisters |
| No | ap- pear- ance | tap- ing test | at a flat part | part of a side face | at a cross- cut part | at a flat part | part of a side face | at a cross- cut part |
| 1 | ○ | ○ | ○ | ○ | ○ | ○ | ◎ | ◎ |
| 2 | ○ | ○ | ○ | ◎ | ◎ | ○ | ◎ | ◎ |
| 3 | ○ | ○ | ○ | ◎ | ◎ | ○ | ◎ | ◎ |
| 4 | ○ | ○ | ○ | ◎ | ◎ | ○ | ◎ | ◎ |

TABLE 6-continued

PROPERTIES OF PAINT LAYERS (INVENTIVE EXAMPLES)

| | corrosion resistance | | | | | moisture resistance | | |
|---|---|---|---|---|---|---|---|---|
| | | | | width of blisters | | | width of blisters | |
| | | appearance | | at a lower burred | width of blisters | appearance | at a lower burred | width of blisters |
| | resistance to boiling water | | | | | | | |
| No | appearance | tapping test | at a flat part | part of a side face | at a cross-cut part | at a flat part | part of a side face | at a cross-cut part |
| 5 | ○ | ○ | ○ | ◎ | ◎ | ○ | ◎ | ◎ |
| 6 | ○ | ○ | ○ | ◎ | ◎ | ○ | ◎ | ◎ |
| 7 | ○ | ○ | ○ | ◎ | ◎ | ○ | ◎ | ◎ |
| 8 | ○ | ○ | ○ | ◎ | ◎ | ○ | ◎ | ◎ |
| 9 | ○ | ○ | ○ | ◎ | ◎ | ○ | ◎ | ◎ |
| 10 | ○ | ○ | ○ | ◎ | ◎ | ○ | ◎ | ◎ |
| 11 | ○ | ○ | ○ | ◎ | ◎ | ○ | ◎ | ◎ |
| 12 | ○ | ○ | ○ | ◎ | ◎ | ○ | ◎ | ◎ |
| 13 | ○ | ○ | ○ | ◎ | ◎ | ○ | ◎ | ◎ |
| 14 | ○ | ○ | ○ | ◎ | ◎ | ○ | ◎ | ◎ |
| 15 | ○ | ○ | ○ | ◎ | ◎ | ○ | ◎ | ◎ |

TABLE 7

PROPERTIES OF PAINT LAYERS (COMPARATIVE EXAMPLES)

| | corrosion resistance | | | | | moisture resistance | | |
|---|---|---|---|---|---|---|---|---|
| | | | | width of blisters | | | width of blisters | |
| | resistance to boiling water | appearance | | at a lower burred | width of blisters | appearance | at a lower burred | width of blisters |
| No | appearance | tapping test | at a flat part | part of a side face | at a cross-cut part | at a flat part | part of a side face | at a cross-cut part |
| 16 | ○ | ○ | ○ | Δ | Δ | ○ | ○ | ○ |
| 17 | ○ | ○ | ○ | Δ | Δ | ○ | ○ | ○ |
| 18 | ○ | Δ | ○ | ◎ | ◎ | ○ | ◎ | ◎ |
| 19 | ○ | ○ | ○ | Δ | Δ | ○ | ◎ | ◎ |
| 20 | ○ | ○ | ○ | Δ | Δ | ○ | ◎ | ◎ |
| 21 | Δ | ○ | ○ | ◎ | ◎ | Δ | ◎ | ◎ |
| 22 | X | Δ | ○ | ◎ | ◎ | Δ | ◎ | ◎ |
| 23 | ○ | Δ | ○ | ○ | ○ | ○ | ◎ | ◎ |
| 24 | ○ | ○ | ○ | X | X | ○ | ◎ | ◎ |
| 25 | ○ | ○ | ○ | X | X | ○ | ◎ | ◎ |
| 26 | ○ | ○ | ○ | Δ | Δ | ○ | ◎ | ◎ |
| 27 | Δ | ○ | ○ | ○ | ○ | ○ | ◎ | ◎ |

Example 3

Various plated steel sheets of 0.5 mm in thickness were surface-conditioned with a ratio of 10 mg/m² calculated as deposited Ni or alkali-degreased. A chemical agent having composition shown in Table 8 was applied to each steel sheet by a bar-type applicator at a ratio of 1 ml/m² and dried at 100° C. as pre-treatment for application of paint.

TABLE 8

COMPOSITIONS OF CHEMICAL AGENTS FOR PRE-TREATMENT OF BASE STEEL SHEETS

| | inventive examples | | | | | | | | comparative examples | | | | |
|---|---|---|---|---|---|---|---|---|---|---|---|---|---|
| Agent No. | 1 | 2 | 3 | 4 | 5 | 6 | 7 | 8 | 9 | 10 | 11 | 12 | 13 |
| fluorotitanate | 65.20 | | | | 48.60 | 50.40 | 0.78 | | | | | | |
| Fluorozirconate | | 35.20 | | | | | | 5.59 | | | | | |
| Fluorosilicate | | | 35.20 | | | | | | | | | | |
| Fluoroborate | | | | 35.20 | | | | | | | | | |
| deionized water | 920.50 | 920.50 | 920.50 | 920.50 | 826.70 | 869.40 | 998.00 | 760.74 | 920.5 | 826.70 | 869.40 | 998.00 | 760.74 |
| colloidal silica | 5.90 | 5.90 | 5.90 | 5.90 | | 5.00 | | | 5.90 | | 5.00 | | |
| vaporized silica | 3.90 | | | | | | | | | | | | |
| zirconium hydroxide | 4.50 | 10.50 | 10.50 | 10.50 | | | | | 10.50 | | | | |
| zirconium carbonate | | | | | 10.00 | 15.00 | | | | 10.00 | 15.00 | | |
| molybdenum hydroxide | | | | | | | | 113.20 | | | | | 113.20 |
| manganese oxide | | | | | 20.00 | | | | | 20.00 | | | |
| hydrogen fluoride | | | | | | | 0.10 | | | | | | |
| phosphoric acid | | | | | 34.50 | | 0.67 | 106.30 | | 34.50 | | 0.67 | 106.30 |
| tannic acid | 5.00 | | | | | | | | | | | | |
| Starch | | | | | | | | 14.17 | | | | | 14.17 |
| polyvinyl alcohol | 5.00 | | | | | | | | | | | | |
| aminomethylated polyvinyl phenol | | 27.90 | 27.90 | 27.90 | 61.20 | 61.20 | 0.45 | | 27.90 | 61.20 | 61.20 | 0.45 | |

A processed surface layer was examined by X-ray fluorescence analysis to measure a total amount of F, Ti, Zr, Hf, Si, Ge, Sn and B deposited thereon. Results are shown in Table 9.

TABLE 9

DEPOSITION RATIOS (by mg/m$^2$) IN RESPONSE TO KINDS OF CHEMICAL AGENTS

| | Agent No. | 1 | 2 | 3 | 4 | 5 | 6 | 7 | 8 |
|---|---|---|---|---|---|---|---|---|---|
| Inventive Examples | fluorides | 40.9 | 17.0 | 31.1 | 32.6 | 39.1 | 34.7 | 0.6 | 2.9 |
| | metals | 35.8 | 28.5 | 16.2 | 13.9 | 19.5 | 23.2 | 0.3 | 2.6 |

| | Agent No. | 9 | 10 | 11 | 12 | 13 |
|---|---|---|---|---|---|---|
| Comparative Examples | fluorides | | 0 | 0 | 5.8 | 0 |
| | metals | 10.5 | 5.3 | 12.6 | 0 | 0 |

A ratio of metals means a total ratio of Ti, Zr, Hf, Si, Ge, Sn and B deposited on a surface of a base steel sheet Each base steel sheet was processed with a chemical agent to form a fluorided layer at a ratio calculated as deposited fluorine, as shown in Table 10 (for inventive examples) and Table 11 (for comparative examples).

TABLE 10

PREPARATION OF STEEL SHEETS FOR PAINT APPLICATION (INVENTIVE EXAMPLES)

| | a coated-base steel sheet | | a fluoride coat | |
|---|---|---|---|---|
| No. | a plating layer | an adhesion ratio (g/m$^2$) | a chemical agent No. | an adhesion ratio (mg/m$^2$) |
| 1 | Zn | 45 | 1 | 50 |
| 2 | Zn | 45 | 1 | 50 |
| 3 | Zn | 45 | 1 | 50 |
| 4 | Zn | 45 | 1 | 50 |
| 5 | Zn | 45 | 1 | 50 |
| 6 | Zn | 45 | 1 | 10 |
| 7 | Zn | 45 | 1 | 100 |
| 8 | Zn | 45 | 2 | 50 |
| 9 | Zn | 45 | 3 | 50 |
| 10 | Zn | 45 | 4 | 50 |
| 11 | Zn | 45 | 5 | 50 |
| 12 | Zn | 45 | 6 | 50 |
| 13 | Zn | 45 | 7 | 50 |
| 14 | Zn | 45 | 8 | 50 |
| 15 | Zn-5% Al | 45 | 1 | 50 |
| 16 | Zn-55% Al | 70 | 1 | 50 |
| 17 | Al | 70 | 1 | 50 |
| 18 | Zn-6Al-3% Mg | 70 | 1 | 50 |
| 19 | Zn-55% Al | 70 | 1 | 50 |
| 20 | Zn-55% Al | 70 | 7 | 50 |

TABLE 11

PREPARATION OF STEEL SHEETS FOR PAINT APPLICATION (COMPARATIVE EXAMPLES)

| | a coated-base steel sheet | | a fluoride coat | |
|---|---|---|---|---|
| No. | a plating layer | an adhesion ratio (g/m$^2$) | a chemical agent No. | an adhesion ratio (mg/m$^2$) |
| 1 | Zn | 45 | 1 | 50 |
| 2 | Zn | 45 | 1 | 50 |
| 3 | Zn | 45 | 1 | 1 |
| 4 | Zn | 45 | 9 | 50 |
| 5 | Zn | 45 | 10 | 50 |
| 6 | Zn | 45 | 11 | 50 |
| 7 | Zn | 45 | 12 | 50 |
| 8 | Zn | 45 | 13 | 50 |
| 9 | Zn | 45 | phosphating | |
| 10 | Zn | 45 | tannic acid | |

After the chemical processing, two types of painted steel sheets were manufactured as follows:

The first group of painted steel sheets are coated with undercoats of 5 μm in dry thickness and topcoats of 15 μm in dry thickness. Primer paints based on a thermosetting epoxy-denatured macromolecular polyester were applied to the surface of the steel sheet and baked at a maximum temperature of 215° C., while macromolecular polyester topcoat paints were applied to the undercoats and baked 40 seconds at a maximum temperature at 230° C.

The second group of painted steel sheets were coated with undercoats of 5 μm dry thickness and topcoats of 15 μm in dry thickness. Primer paints based on a polyether sulfonate were applied to the steel sheets and baked 120 seconds at a maximum temperature of 340° C., while topcoat paints based on a polyether sulfonate containing PTFE (polytetrafluoroethylene) were applied to the undercoats and baked 180 seconds at a maximum temperature of 410° C.

In each case, paint compositions (shown in Tables 12 and 13) containing the corrosion inhibitor A and the polyphosphate B were used as primer paints.

In some of comparative examples, painted steel sheets were prepared from base steel sheet which were subjected to conventional chemical converting treatment using a phosphate or tannic acid, or to chemical converting treatment using the same chemical agent as in the inventive examples except for omission of fluoroacids. In others of comparative examples, primer paints containing either one of the corrosion inhibitor A and the polyphosphate B were also applied to base steel sheets.

TABLE 12

PRIMER PAINT COMPOSITIONS (INVENTIVE EXAMPLES)

| No. | base resin | a corrosion inhibitor A (parts by wt.) | an A/B weight ratio | an A + B ratio (parts by wt.) |
|---|---|---|---|---|
| 1 | I | 2 | 25/75 | 8 |
| 2 | I | 13 | 25/75 | 50 |
| 3 | I | 30 | 25/75 | 150 |
| 4 | I | 5 | 10/90 | 50 |
| 5 | I | 25 | 50/50 | 50 |
| 6 | I | 13 | 25/75 | 50 |
| 7 | I | 13 | 25/75 | 50 |
| 8 | I | 13 | 25/75 | 50 |
| 9 | I | 13 | 25/75 | 50 |
| 10 | I | 13 | 25/75 | 50 |
| 11 | I | 13 | 25/75 | 50 |
| 12 | I | 13 | 25/75 | 50 |
| 13 | I | 13 | 25/75 | 50 |
| 14 | I | 13 | 25/75 | 50 |
| 15 | I | 13 | 25/75 | 50 |
| 16 | I | 13 | 25/75 | 50 |
| 17 | I | 13 | 25/75 | 50 |
| 18 | I | 13 | 25/75 | 50 |

TABLE 12-continued

PRIMER PAINT COMPOSITIONS (INVENTIVE EXAMPLES)

| No. | base resin | a corrosion inhibitor A (parts by wt.) | an A/B weight ratio | an A + B ratio (parts by wt.) |
|---|---|---|---|---|
| 19 | II | 13 | 25/75 | 50 |
| 20 | II | 13 | 25/75 | 50 |

Base resin I is epoxy-denatured macromolecular polyester primer with macromolecular polyester topcoat, and II is polyether sulfonate (PES) primer with PES/PTFE topcoat.

TABLE 13

PRIMER PAINT COMPOSITIONS (INVENTIVE EXAMPLES)

| No. | base resin | a corrosion inhibitor A (parts by wt.) | an A/B weight ratio | an A + B ratio (parts by wt.) |
|---|---|---|---|---|
| 1 | I | ion-exchanged silica solely | | 50 |
| 2 | I | aluminum polyphosphate solely | | 50 |
| 3 | I | 13 | 25/75 | 50 |
| 4 | I | 13 | 25/75 | 50 |
| 5 | I | 13 | 25/75 | 50 |
| 6 | I | 13 | 25/75 | 50 |
| 7 | I | 13 | 25/75 | 50 |
| 8 | I | 13 | 25/75 | 50 |
| 9 | I | 13 | 25/75 | 50 |
| 10 | I | 13 | 25/75 | 50 |

Each painted steel was examined by the same tests as in Example 1 to research properties of a paint layer such as boiling water resistance, corrosion resistance and moisture resistance. Results are shown in Tables 14 (for inventive examples) and Table 15 (for comparative examples).

TABLE 14

PROPERTIES OF PAINT LAYERS (INVENTIVE EXAMPLES)

| Resistance to | boiling water | | corrosion resistance | | | moisture resistance | | |
|---|---|---|---|---|---|---|---|---|
| No. | appearance | Tapping test | at a flat part | at a lower burred part | at a cross-cut part | at a flat part | at a lower burred parts | at a cross-cut part |
| 1 | ○ | ○ | ○ | ◎ | ○ | ○ | ◎ | ◎ |
| 2 | ○ | ○ | ○ | ◎ | ◎ | ○ | ◎ | ◎ |
| 3 | ○ | ○ | ○ | ◎ | ◎ | ○ | ◎ | ◎ |
| 4 | ○ | ○ | ○ | ◎ | ◎ | ○ | ◎ | ◎ |
| 5 | ○ | ○ | ○ | ◎ | ◎ | ○ | ◎ | ◎ |
| 6 | ○ | ○ | ○ | ◎ | ◎ | ○ | ◎ | ◎ |
| 7 | ○ | ○ | ○ | ◎ | ◎ | ○ | ◎ | ◎ |
| 8 | ○ | ○ | ○ | ◎ | ◎ | ○ | ◎ | ◎ |
| 9 | ○ | ○ | ○ | ◎ | ◎ | ○ | ◎ | ◎ |
| 10 | ○ | ○ | ○ | ◎ | ◎ | ○ | ◎ | ◎ |
| 11 | ○ | ○ | ○ | ◎ | ◎ | ○ | ◎ | ◎ |
| 12 | ○ | ○ | ○ | ◎ | ◎ | ○ | ◎ | ◎ |
| 13 | ○ | ○ | ○ | ◎ | ◎ | ○ | ◎ | ◎ |
| 14 | ○ | ○ | ○ | ◎ | ◎ | ○ | ◎ | ◎ |
| 15 | ○ | ○ | ○ | ◎ | ◎ | ○ | ◎ | ◎ |
| 16 | ○ | ○ | ○ | ◎ | ◎ | ○ | ◎ | ◎ |
| 17 | ○ | ○ | ○ | ◎ | ◎ | ○ | ◎ | ◎ |
| 18 | ○ | ○ | ○ | ◎ | ◎ | ○ | ◎ | ◎ |
| 19 | ○ | ○ | ○ | ◎ | ◎ | ○ | ◎ | ◎ |
| 20 | ○ | ○ | ○ | ◎ | ◎ | ○ | ◎ | ◎ |

TABLE 15

PROPERTIES OF PAINT LAYERS (COMPARATIVE EXAMPLES)

| Resistance to | boiling water | | corrosion resistance | | | moisture resistance | | |
|---|---|---|---|---|---|---|---|---|
| No. | appearance | tapping test | at a flat part | at a lower burred part | at a cross-cut part | at a flat part | at a lower burred part | at a cross-cut part |
| 1 | X | Δ | ○ | ○ | ○ | Δ | ○ | ○ |
| 2 | ○ | ○ | ○ | Δ | Δ | ○ | ○ | ○ |
| 3 | ○ | Δ | ○ | Δ | Δ | ○ | ◎ | ◎ |
| 4 | ○ | Δ | ○ | Δ | Δ | ○ | ◎ | ◎ |
| 5 | ○ | Δ | ○ | Δ | Δ | ○ | ◎ | ◎ |
| 6 | ○ | Δ | ○ | Δ | Δ | ○ | ◎ | ◎ |
| 7 | ○ | Δ | ○ | Δ | Δ | ○ | ◎ | ◎ |
| 8 | ○ | Δ | ○ | Δ | Δ | ○ | ◎ | ◎ |
| 9 | ○ | ○ | ○ | Δ | Δ | ○ | ◎ | ◎ |
| 10 | ○ | ○ | ○ | X | X | ○ | ◎ | ◎ |

It is noted from Table 15 that paint layers formed on steel sheets as comparative examples had disadvantages on at least one or more of boiling water resistance, corrosion resistance and moisture resistance. On the other hand, paint layers (shown in Table 14) formed on steel sheets as inventive examples were superior to any of boiling water resistance, corrosion resistance and moisture resistance. The comparison proves that painted steel sheets according to the present invention are excellent in all of boiling water resistance, corrosion resistance and moisture resistance without inclusion of chromium compounds.

According to the present invention as above-mentioned, there is provided a painted steel sheet excellent in corrosion and moisture resistance due to co-existence of the corrosion inhibitor A and the polyphosphate B in a paint layer without use of chromium compounds, which would put harmful influences on the environment. Since the polyphosphate B controls dissolution of Ca ion from the corrosion inhibitor A, the corrosion inhibitor A maintains its corrosion-inhibiting faculty over a long term.

What is claimed is:

1. A painted metal sheet having a surface chemically treated with a chemical agent containing at least one fluoroacid coated with a paint layer, which comprises a base resin and dispersed therein particles of a chromium-free corrosion inhibitor prepared from porous silica particles to which Ca ion is bonded by ion-exchange, a polyphosphate and optionally other pigment(s), formed on a surface of a base metal sheet, wherein said composition is positioned on said treated surface of said metal sheet without the interposition of a chromium containing layer.

2. The painted metal sheet defined in claim 1, wherein the base metal sheet is a steel sheet coated with a Zn, Zn—Al or Al plating layer.

3. The painted metal sheet define in claim 1, wherein the fluoroacids are one or more of $H_2TiF_6$, $H_2ZrF_6$, $H_2HfF_6$, $H_2SiF_6$, $H_2SnF_6$ and $HBF_4$.

4. The painted metal sheet define in claim 1, wherein fluorides are deposited on the surface of the steel sheet at a ratio of 0.5–500 mg/m$^2$ calculated as deposited fluorine and/or at a ratio of 0.1–500 mg/m$^2$ calculated as deposited metals in total.

5. The painted metal sheet defined in claim 1, wherein the paint layer is an undercoat on which a topcoat is formed.

6. The painted metal sheet defined in claim 1, wherein the base resin is polyester, macromolecular polyester, epoxy, epoxy-denatured polyester, epoxy-denatured macromolecular polyester or polyether sulfonate.

7. The painted metal sheet defined in claim 1, wherein the corrosion inhibitor is porous silica particles, to which Ca ion is bonded at a ratio of 3–40 weight %.

8. The painted metal sheet defined in claim 1, which contains the corrosion inhibitor at a ratio of 2–50 parts by weight based on 100 parts by weight of resinous components.

9. The painted metal sheet defined in claim 1, wherein the polyphosphate is one or more of aluminum pyrophosphate, aluminum metaphosphate or aluminum dihydrogentripolyphosphate.

10. The painted metal sheet defined in claim 1, which contains the corrosion inhibitor and the polyphosphate at an A/B weight ratio of 60/40 to 5/95 and at an A+B ratio of 5–150 parts by weight based on 100 parts by weight of resinous components, wherein A and B represents the corrosion inhibitor and the polyphosphate, respectively.

11. The painted metal sheet defined in claim 1, wherein the other pigment(s) are one or more of titanium oxide, calcium carbonate and silica.

* * * * *

UNITED STATES PATENT AND TRADEMARK OFFICE
CERTIFICATE OF CORRECTION

PATENT NO. : 6,890,648 B2
DATED : May 10, 2005
INVENTOR(S) : Yano et al.

It is certified that error appears in the above-identified patent and that said Letters Patent is hereby corrected as shown below:

Column 1,
Line 48, "such the demand" should read -- such demand --.

Column 4,
Line 67, "in prior to application" should read -- prior to application --.

Column 14,
Lines 54 and 57, "metal sheet define" should read -- metal sheet defined --.

Signed and Sealed this

Twenty-second Day of November, 2005

JON W. DUDAS
*Director of the United States Patent and Trademark Office*